United States Patent [19]

Graf et al.

[11] Patent Number: 5,002,789
[45] Date of Patent: Mar. 26, 1991

[54] FOOD COLORANT SYSTEM

[75] Inventors: Ernst Graf, New Brighton, Minn.; Marcus Karel, Newton, Mass.; Israel A. Saguy, Edina, Minn.

[73] Assignees: The Pillsbury Company, Minneapolis, Minn.; Massachusetts Institute of Technology, Cambridge, Mass.

[21] Appl. No.: 338,828

[22] Filed: Apr. 17, 1989

[51] Int. Cl.$^5$ .............................................. A23L 1/00
[52] U.S. Cl. .................................. 426/540; 426/250; 426/262
[58] Field of Search ................... 426/540, 250, 94, 262

[56] References Cited

U.S. PATENT DOCUMENTS 3,464,828  9/1969  Cummisford ..................... 426/250
4,313,966  2/1982  Basa et al. ........................ 426/540

Primary Examiner—George Yeung
Attorney, Agent, or Firm—Kinney & Lange

[57] ABSTRACT

A coloring system and method for use is provided. The coloring system comprises a diluent and colorant in particle form. The dilution ratio and particle size can be utilized to control the color of the system during distribution and storage. The colorant can be any desired color, for example, brown, red, etc., and the system can be made such that it is generally invisible when applied to the product. When the food product with the associated coloring system is exposed to heat, e.g. radiation, the colorant becomes visible providing color to the food product in a preselected region. A carrier can also be provided in the coloring system to provide shelf life stability to the coloring system when the coloring system is applied to the food prior to distribution.

31 Claims, 13 Drawing Sheets

Fig. 13A
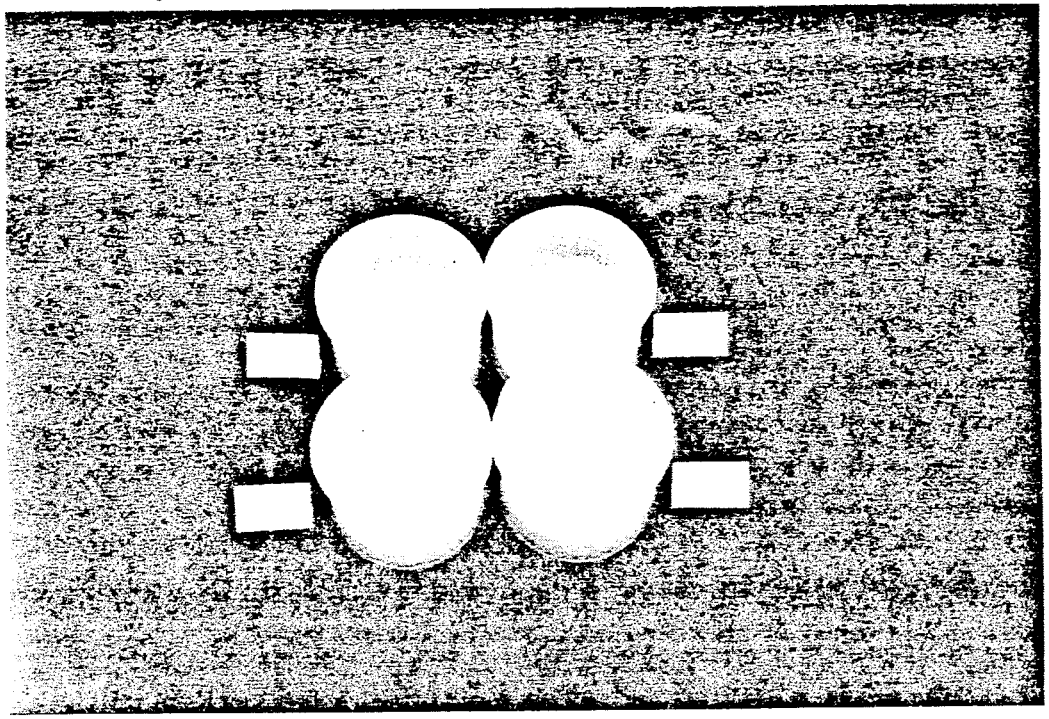
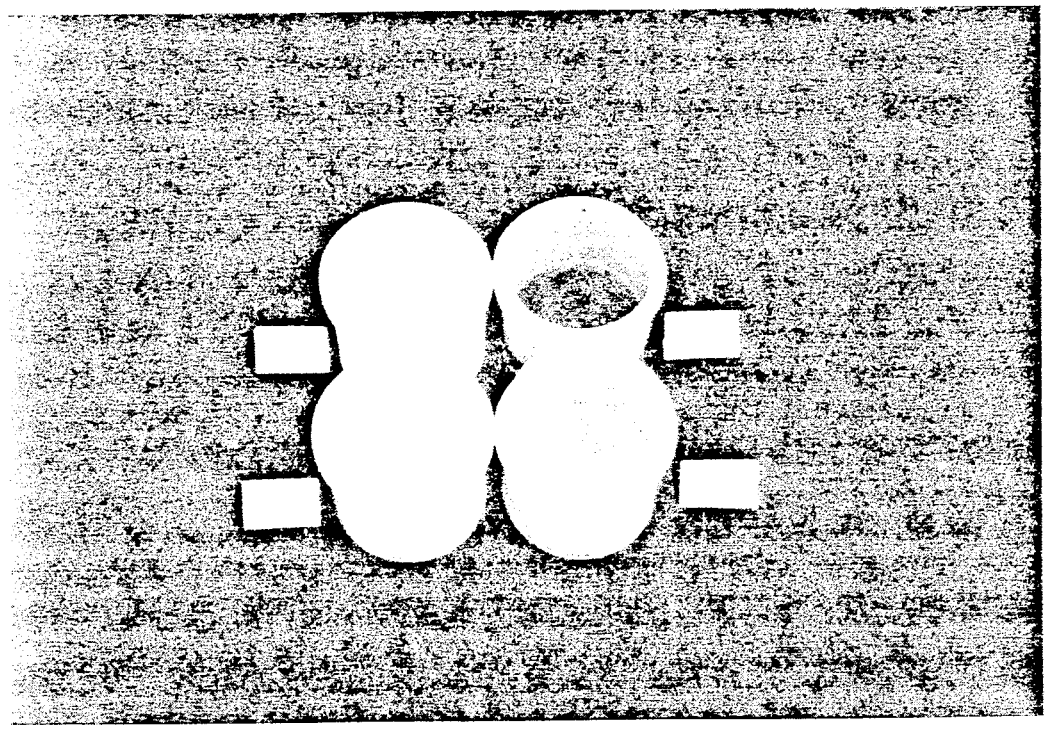
Fig. 13B

FOOD COLORANT SYSTEM

BACKGROUND OF THE INVENTION

The present invention relates to a process for heat-induced food coloring and a color system therefor. Using principles of food science, chemistry and physics, a system has been developed that may be used to color selected regions of foods upon exposure of a food to microwave radiation or heat by conventional cooking methods.

A major part of the appetizing appearance of conventionally heated foods is imparted by color, particularly brown, developed during preparation. Consumers have come to expect this brown appearance and consider it desirable in a variety of food products including meat, cheese, and cereal grain based products. It is not usually difficult to obtain a browned appearance under conventional oven cooking conditions because the reactions leading to brown colors will proceed in the presence of the components included in or added to the surface of most foods. However, it has been very difficult to obtain brown colors on the surfaces of foods prepared in microwave ovens without using browning devices.

Reasons why surfaces of microwave prepared products do not brown have been suggested (see for example, D. C. T. Pei, Baker's Digest, February 1982). This reference states that heat in a conventional oven is transmitted from the oven environment to the food surface via convection and transmitted from the surface to the interior of the product via conduction. This process of heat transfer enables the food surface to dehydrate and reach temperatures above the boiling point of water by the end of the conventional bake time. Microwaves, however, penetrate the surface and product and directly heat the interior of the product. This induces moisture transfer to the surface. Evaporation of the moisture from the surface to the microwave oven environment usually restricts the surface temperature to a maximum of about the boiling point of water during the microwave bake time. The resultant surface temperature is too low to enable the normal browning reactions to proceed at the necessary rate. In addition to the depressed rate of microwave browning versus conventional browning due to the temperature conditions, microwave preparation times are generally much shorter than conventional preparation times. Therefore, according to the aforementioned reference, the surface conditions and preparation times, resulting from the basic differences in heat transfer mechanisms between microwave and conventional heating, create a very difficult problem for those desiring to effect browning in a microwave oven.

Generally, the solutions to microwave browning can be divided into the following categories: packaging aided, cosmetic, and reactive coating approaches. The first approach involves the use of microwave susceptors which heat to temperatures exceeding the boiling point of water and brown surfaces in close proximity or direct contact (see for example, U.S. Pat. No. 4,266,108). Limitations of commercially available susceptors include the requirement of close proximity or direct contact, their generally uncontrolled temperature profile, and their generally high cost. The second approach is cosmetic and includes various surface applied formulations that are brown prior to application (U.S. Pat. No. 4,640,837, and U.S. patent application Ser. No. 055,851, Zimmerman et al.). The third approach involves coating the surface with a formula that will react to yield a brown color at the surface under microwave conditions described above. Two such variations of this approach are described in U.S. Pat. Nos. 4,735,812 and 4,448,791.

Advantages of the present invention over prior art include: control of color development prior to microwave heating thus allowing distribution of coated food products at any standard food distribution temperature (frozen, refrigerated, or shelf stable); use of the coating on many types of foods including those with dimensions that increase during manufacturing, distribution, or microwave heating (e.g., doughs and batters); the color system can be positionally stable, the end points of browning and textural development can be caused to coincide; quantitative control of the color agents; dual microwave and conventional cooking applicability; tolerance to cooking time and conditions; and predictability.

The success of a product approach to browning requires control over the rate of the browning reaction. During the shelf life of a product, the rate of browning should be controlled or the product may brown prior to preparation by the consumer. Then, on exposure to a microwave field, the rate should be sufficiently high to brown the product during the short preparation times generally encountered with microwave products.

However, some of the above solutions to browning may result in various types of problems. The susceptor approach requires the addition of an additional packaging element or the use of an appliance in the microwave oven. The, reactive dough layer disclosed in U.S. Pat. No. 4,448,1791 to R. Fulde et al. requires the addition of a thin layer of a food product which poses some difficulties in handling. Further, the reactive dough layer system exhibits shelf life or distribution system related problems due to browning occurring prematurely and/or the color being diluted during freeze/thaw cycles. The last mentioned solution to browning, as all the other discussed references, are also limited only to the development or formation (production) of a brown color. The present invention is not so limited in that it can provide any desired color on the product when it is exposed to microwave radiation or heat while the color is substantially invisible to the consumer during shelf life and prior to preparation in the microwave oven. Further, the present invention can be utilized to provide color in any preselected region of the food, i.e. as a surface colorant and/or an interior colorant.

Other solutions to browning have been provided, for example, that set forth in the patent application entitled "Process for Microwave Browning" by D. Domingues et al. Ser. No. 339,567, filed Apr. 17, 1989, the disclosure of which is incorporated herein by reference. This latter system works very well with numerous starch-based items, particularly of the bread-type, for example, bread, biscuits, corn bread, quick breads, pastries, etc. It also provides the ability to reach a desired degree of brown coloration simultaneously with the desired texture development of the food substrate.

SUMMARY OF THE INVENTION

The present invention provides a coloring system for use with food products for reheating or cooking in a microwave oven. The system comprises a colorant, a color diluent and an optional carrier which retains the diluent and the colorant immobilized and isolated preventing premature coloration. During storage, the carrier and/or the diluent reduces the color intensity of the colorant to an extent to which the coloring system is substantially invisible to the consumer when the system is associated with a food product. During heating the diluent and carrier visually disappear leaving the colorant, which preferably has a high extinction coefficient, visible. The colorant is positionally retained in the food product region where applied because of its preselected properties such as particle size and/or the solubility and/or viscosity of the system.

The present invention utilizes the physics of light and the principles of food science and chemistry to effect an effective and desirable coloring system which can produce or provide any desired color in any preselected region of a food product, which color is made visible during microwave and/or conventional heating of the food product.

By controlling the particle size of the diluent and colorant, selection of an appropriate carrier, if any, color of the colorant (the visible spectrum of the colorant), appropriate and preselected coloring of the food can be accomplished. The initial and final colors can be preselected and final color can be substantially independent of microwave and/or conventional heating time once solubilization of the diluent and colorant is accomplished providing heating tolerance. The system can also be made to be dependent on microwave heating time, e.g., to indicate when the product is done.

Thus, with the present coloring system, means are provided to simply control the initial color and the final color of preselected regions of a food product.

It is an advantage of the present invention to provide a coloring system which requires low product temperature and short cooking time to effect color change.

Another advantage of the present invention is that it can be made such that color development is independent or substantially independent of heating time.

Another advantage of the present invention is to provide a system wherein the color of the preselected region of the food product after heating is predetermined.

Another advantage of the present invention is to provide a coloring system which can provide any desired product final color with the initial color of the system being substantially invisible to the consumer prior to heating.

Another advantage of the present invention is to provide a coloring system which can be used in a decorative manner, for example, single or multicolored cookies.

Another advantage of the present invention is to provide a coloring system which when applied to a food product does not adversely affect the color appearance of the food substrate, that is, the coloring system can be colored to match the food substrate.

Other objects and advantages of the present invention will become apparent from the following detailed description of the invention.

DESCRIPTION OF THE FIGURES

The following graphs were made using RT 175 caramel from Sethness Company and sucrose type sugar. The particle sizes listed were measured by sieve sizing with U.S. standard brass sieves. The various tri-stimulus values, for example the CIE $L^*$, $a^*$ and $b^*$, were measured by a Milton Roy total reflectance spectrophotometer. The samples tested were thick and uncompacted. Particle size as used herein means that the particles all passed through the designated screen size, i.e. they are equal to or less than the designated size unless a size range is indicated then the size is within the expressed range. Unless otherwise indicated all percents and ratios are by weight.

FIG. 13A is a color photograph showing mixtures of colorant diluted with sugar and FIG. 13B shows the same coloring system when mixed with water.

Figure 1:
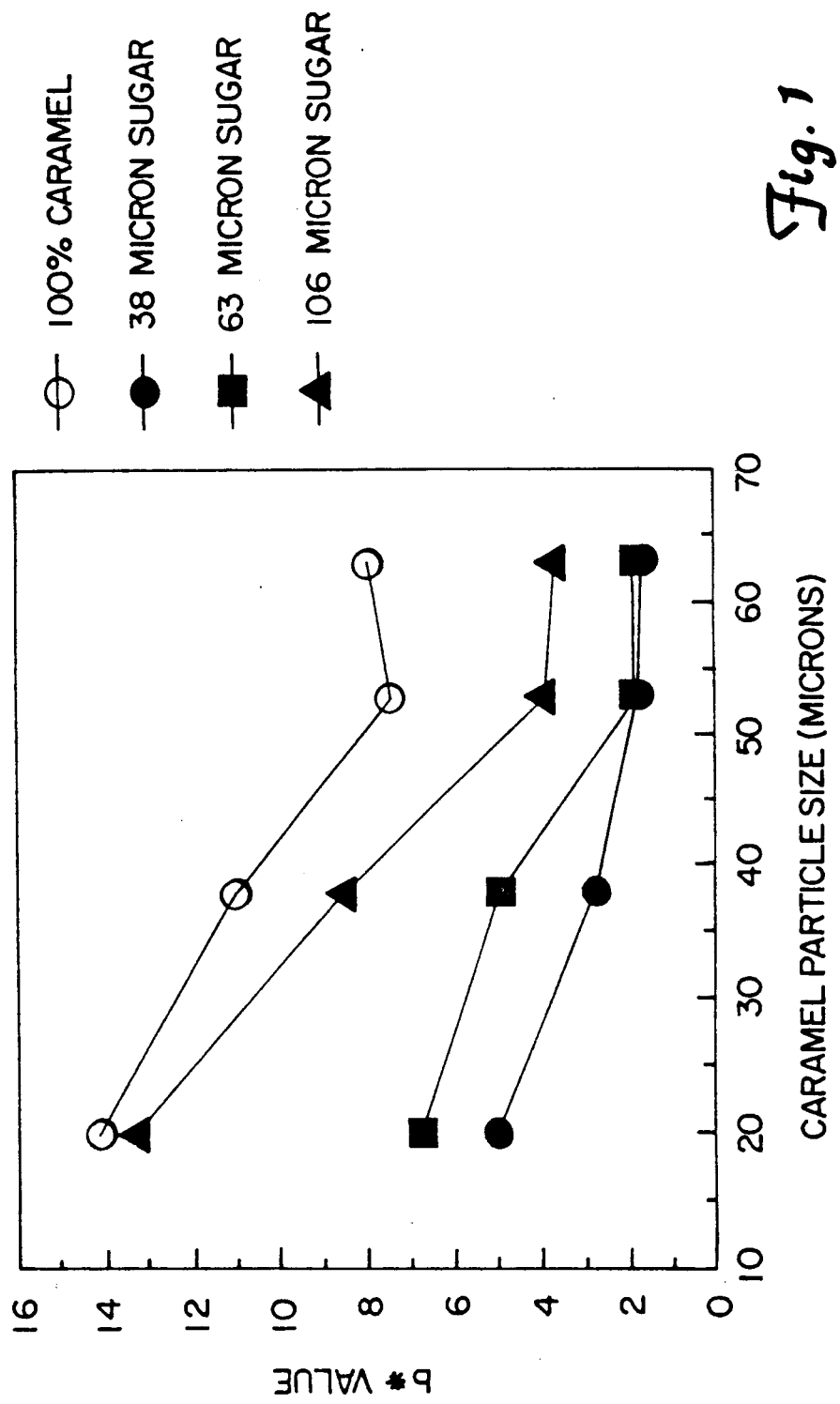
FIG. 1 is a graph showing a functional relationship between $b^*$ and caramel particle size. The sugar: caramel ratio was 95:5.
Figure 2:
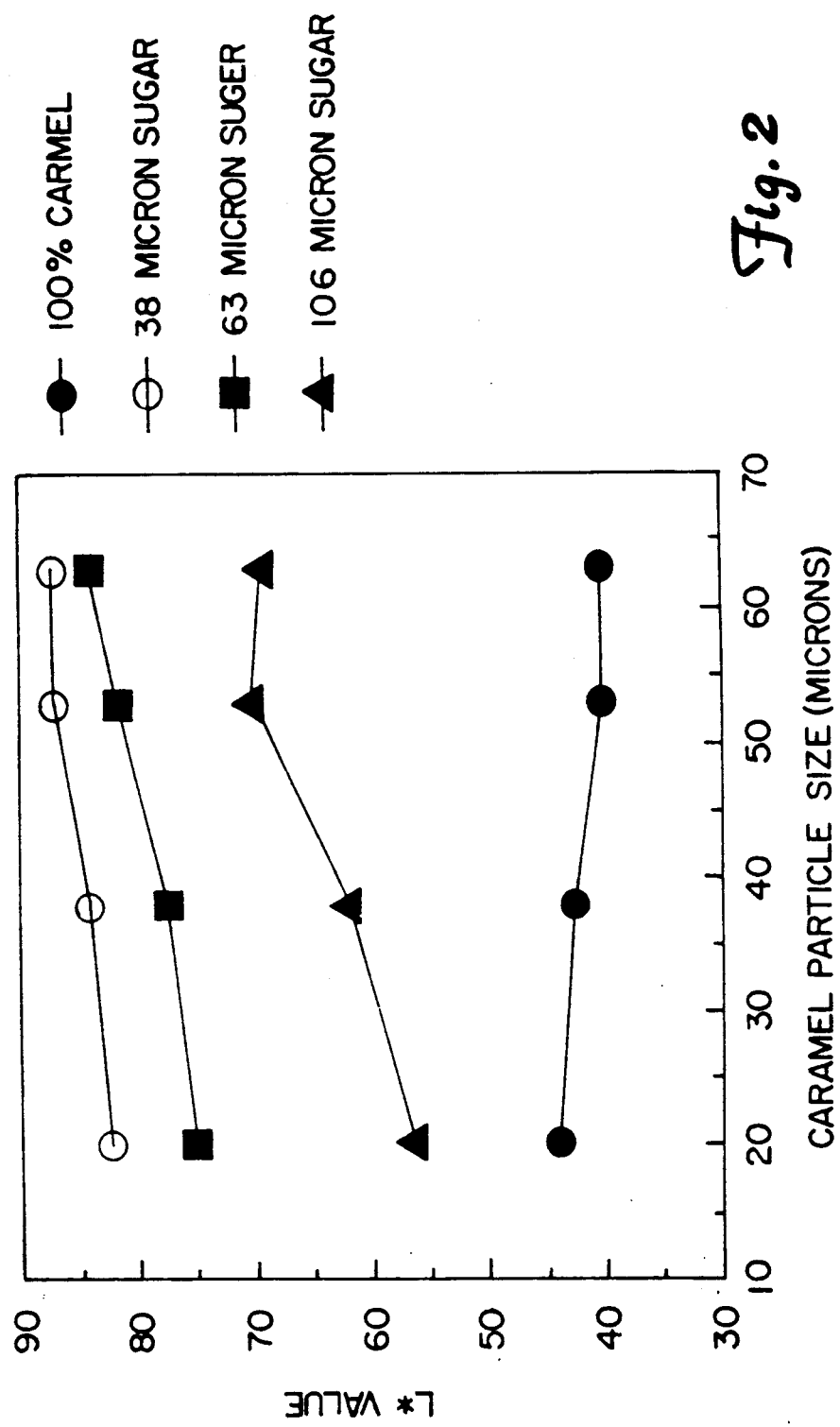
FIG. 2 is a graph showing the functional relationships between $L^*$ and caramel particle size. A sugar: caramel ratio of 95:5 was used.
Figure 3:
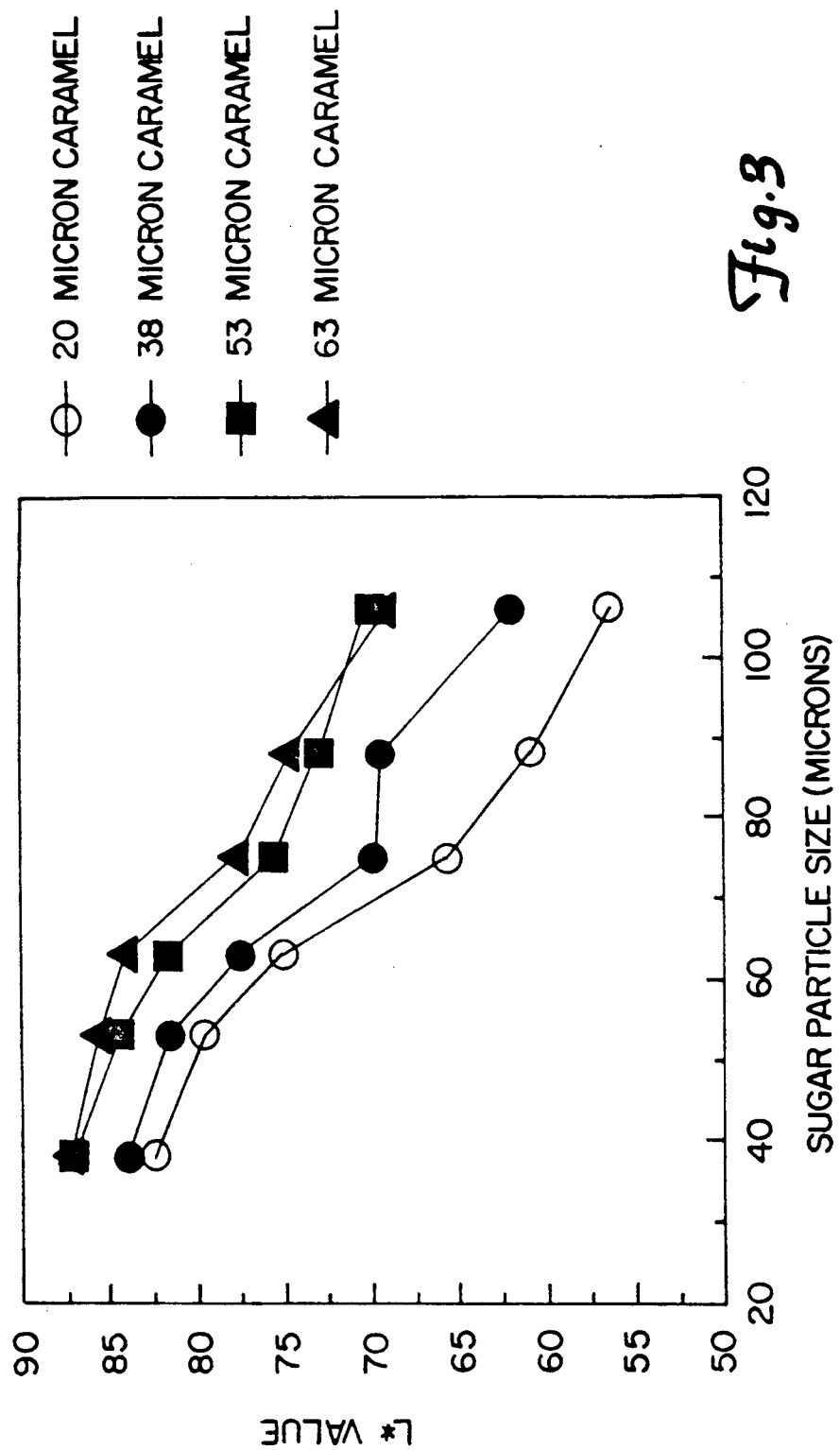
FIG. 3 is a graph illustrating the functional relationships between $L^*$ and sugar particle size for various caramel particle sizes. A sugar: caramel ratio of 95:5 was used.

The file of this patent contains at least one drawing executed in color. Copies of this patent with color drawings will be provided by the Patent and Trademark Office upon request and payment of the necessary fee.

The coloring system as described herein comprises two basic components and one optional component: (1) an optional, preferably food system insoluble, carrier which functions to hold the coloring system immobile relative to the food substrate and to prevent premature dissipation of the diluent and/or colorant, (2) a diluent which is selectively dissipatable, e.g. soluble in portions of the food product and is in particulate form to scatter light thereby reducing color intensity and (3) a colorant of preselected color (and extinction coefficient) which is preferably selectively soluble in portions of the food product and is in particulate form with its color intensity (L*) being reduced by the diluent and/or carrier.

The carrier can be any suitable edible substance which when placed in association with or applied to a substrate food product in a preselected region, for example the interior of the product, the exterior surface of the product, etc., will prevent or retard dissipation, e.g., by solubilization of the coloring system by a component of the food in the preselected region or location and prevent premature product coloration. The carrier, depending on function and food substrate, can be hydrophilic, hydrophobic, lipophilic or lipophobic. It is preferred that the carrier be insoluble in the substrate food product and dissipatible, e.g. by diffusion thereinto when heated or soluble or dispersible in the food product or evaporatable into the environment when the preselected heating temperature is attained.

The coloring system should have a color change effected when the food product is heated, e.g. cooking, for consumption. It is preferred that the color change occur when the food product is heated to a temperature of at least about 10° C., more preferably at least about 15° C. and most preferably at least about 20° C. greater than the food product storage temperature. Shelf storage temperatures are generally in the range of between about 20° C. and about 38° C., refrigerated storage temperatures are in the range of between about 2° C. and about 7° C. and frozen storage conditions are generally in the range −30° C. and about −7° C. For hot products, it is preferred that the color change occur when the region of the food product containing the color system or heating chamber temperature is at least about 38° C., preferably at least about 50° C., more preferably at least about 60° C. and most preferably at least about 65° C.

For most bread and cake like products a preferred carrier is a lipid, for example fat, having a CMP (capillary melting point) in excess of about 63° C. For some foods, a hydrophilic gum can also be a carrier if the diluent and colorant are substantially insoluble therein throughout the distribution conditions and time normally experienced by the food substrate of interest.

The carrier should be associated with the color system in a manner and an amount to immobilize the system for storage stability. The carrier is present in the coloring system in the range of between about 5% and about 80% by weight of system, preferably in the range of between about 10% and about 50% by weight of system, and most preferably in the range of between about 20% and about 25% by weight of system. Unless otherwise specified, all percents herein are percents by weight and all test conditions, unless otherwise specified, are at room temperature, i.e. 21° C. When the system uses particles of carrier with the colorant therein, at least the weight majority of the carrier particles should have a size in the range of between about 20 microns and about 300 microns preferably in the range of between about 30 microns and about 200 microns and more preferably in the range of between about 50 microns and about 150 microns.

Figure 8:
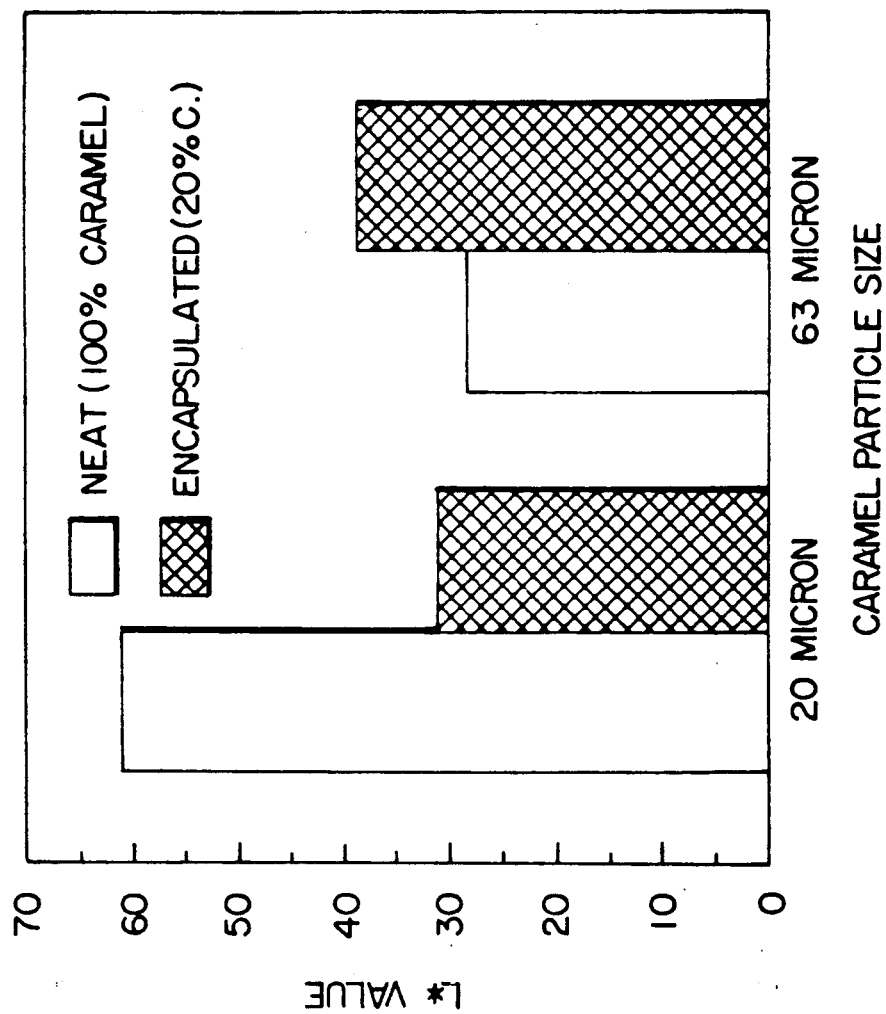
FIG. 8 is a bar graph illustrating an effect of microencapsulation on $L^*$ and an effect of caramel particle size.

As seen in FIG. 8, microencapsulation of a caramel and sugar mixture can effect a darkening of the coloring system depending on process and final particle size. This effect of the microencapsulation process on L* is another control mechanism for determining and controlling the color of the coloring system prior to heating.

One method of encapsulating particles of diluent or colorant or coparticles of diluent and color is by the use of a disk rotation procedure to produce a micromatrix. Such a disk rotation can use a cupped stainless steel disk type mixer available at Southwest Research Institute in San Antonio, Tex. This will encapsulate the diluent and colorant particles within an encapsulant like fat. Also, a fluidized bed encapsulation process can be used to form microspheres that contain a core of particles or coparticles of diluent and colorant. This should provide a longer shelf-live than a rotation procedure as discussed above. The use of a fluidized bed encapuslation process should allow for high payloads of diluent and colorant within the capsules in addition to longer shelf-life stability.

It is preferred that when the colorant and diluent are encapsulated in particles that the encapsulant particles have a size in the range of between 20 microns and about 300 microns preferably in the range of between about 30 microns and about 200 microns and most preferably in the range between about 50 microns and about 150 microns.

The diluent is preferably in particle form, colorless when in solution, soluble in a food system component and can comprise any edible material which can be comminuted to form small particles. In general, the smaller the particle size the greater the light reflectance and therefore the lighter (high L* value) the system will appear in color. The usable diluent particle size and amount will be determined by the degree of lightening of color desired and the type of diluent. It has been found that the weight majority of the diluent particles should be in the range of between about 1 microns and about 50 microns, preferably in the range of between about 1 microns and about 20 microns, and most preferably in the range of between about 1 microns and about 5 microns as measured by light microscopy and image analysis or sieve sizing.

With some diluents, it should be noted that attempts to make particle size smaller can result in the particles agglomerating, thereby forming larger co-particles and in effect reducing the light reflectance.

Diluents can include such edible substances as: sugar, e.g., fructose, sucrose, dextrose, etc.; salt; and maltodextrins. The type of diluent will be determined by its flavor characteristics and the effect of that flavor on the particular food substrate of interest. Further, the diluent can be chosen for its dielectric properties and texture modifying effect on the product.

The diluent should also be dissipatible such that upon heating, it becomes substantially invisible to the eye. This can be accomplished by solubilizing, etc., it with a component of the food product, for example the fat or water. Examples of such a diluent are is sodium stearoyl lactylate (SSL) for fat and sugar for water. The diluent should also be capable of diffusing into the product or into the environment surrounding the product. For example, the diluent could form a gas or a vapor and diffuse into the air or a packaging component.

A diluent is present in the system in an amount which is normally determined by the amount of colorant to be added and the desired color for the system. Preferably it is added to the colorant in an amount to give a DE value for the mixture of colorant and diluent relative to the colorant alone of at least about 10, preferably at least about 30, and more preferably at least about 60. DE value is a parameter identified as the "color change" and is defined as $$DE = \sqrt{(\Delta L^*)^2 + (\Delta a^*)^2 + (\Delta b^*)^2}$$

where $\Delta L^* = L^*_c - L^*_{c+d}$ ($L^*_c = L^*$ of the colorant and $L^*_{c+d} = L^*$ of the colorant and diluent mixture)

FIGS. 1–4 show an example of the effect of diluent particle size and diluent concentration on system color when the colorant is caramel. In these Figures, RT 175 caramel from Sethness Company was used which had CIE L* a* b* values as follows:

| Size of Caramel | L* | a* | b* |
| --- | --- | --- | --- |
| 63 microns | 40.36 | 7.20 | 7.93 |
| 53 microns | 40.20 | 7.38 | 7.39 |
| 38 microns | 42.67 | 9.78 | 11.02 |
| 20 microns | 44.10 | 10.91 | 14.14 |

It can be seen from these Figures that both particle size and diluent concentration affect initial system color. The shape of the particles also affects color, e.g. the method of spray drying can have a large effect on the b* value. This control can be utilized to provide a system of desired coloration. This can be advantageous, for example, if one wanted to apply the system to a corn-based dough so that the system would be substantially invisible to a consumer. If the system were white on a corn-based dough, this could be perceived as a negative by the consumer. Thus, the present invention provides great latitude in the formulation of the system and its uses with minimal or no consumer negatives. The ratio of diluent to colorant as discussed above is dependent upon the preselected final system/food product color. However, it has been found that the diluent to colorant ratio should be in the range of between about 10:1 to 100:1, preferably in the range of between about 20:1 to 60:1, and most preferably in the range of between about 25:1 to 50:1 by weight ratio to colorant.

FIG. 13A is a color photograph showing the effectiveness of the present invention. In this Figure, colorants were diluted with sugar and all samples appear to be the same white color. However, when water is added to the mixtures of colorant and diluent solubilizing the diluent, the various colors of the colorants appear as shown in FIG. 13B.

The colorant can be any suitable food grade edible dry or liquid containing colorant. Preferably the colorant contains less than about 5% by weight liquid like water or fat. The colorant can be insoluble to soluble by a portion of the food product and/or color system. Examples of colorants are caramel, which can come in various color ranges, food colors or dyes, and spices like paprika and cinnamon. It is preferred that the colorant have a high extinction coefficient. The higher the extinction coefficient the greater the coloring capacity of the colorant when in solution. When the system is in solution, the extinction coefficient will determine the intensity of color. When the system is in particle form the particle size and initial color of the colorant and diluent, the dilution ratio with the diluent and the type of carrier will determine the color of the system.

The colorant should have a weight majority of the particles of a size less than about 100 microns, preferably less than about 75 microns, more preferably less than about 60 microns. The size is in the range of between about 10 microns and about 60 microns, preferably in the range of between about 20 microns and about 50 microns and more preferably in the range of between about 30 microns and about 40 microns.

The colorant can be hydrophilic, hydrophobic, lipophilic or lipophobic. Preferably, for a uniform color, the colorant is soluble in a food product or color system component, e.g. water or fat.

It is preferred that the colorant, when it contains liquid like water or fat, have sufficient viscosity to be immobilized within the system and to not solubilize the diluent. Colorants preferably are dried so as to be in a particle form. Further, it is preferred that the colorant have a sufficiently high extinction coefficient and when in solution minimum diffusibility into the product from the original region of application so as to maintain the colorant in the preselected region of the food product. It is preferred that the colorant be present in the system in the range of between about 0.1% and about 10%, preferably in the range of between about 0.2% and about 5% and most preferably in the range of between about 0.5% and about 2% by weight of system when a carrier is used. The extinction coefficient is normally determined by the chemical makeup of the colorant.

The colorant can also be nonsoluble/nondissipatible particles if a mottled or speckled appearance is not objectionable. Other forms of colorant could also be used. The colorant could include components that react under heat to produce a different color than the two original colors of the components or the colorant could react with a food substrate component to produce a different color.

It is important that the diluent and the carrier (if used) dissipate to become visually invisible or substantially invisible by e.g. solubilization, as discussed above during the heating of the food product. In a preferred form of the invention, the diluent is solubilized by one of the liquid components of the food system.

Figure 5:
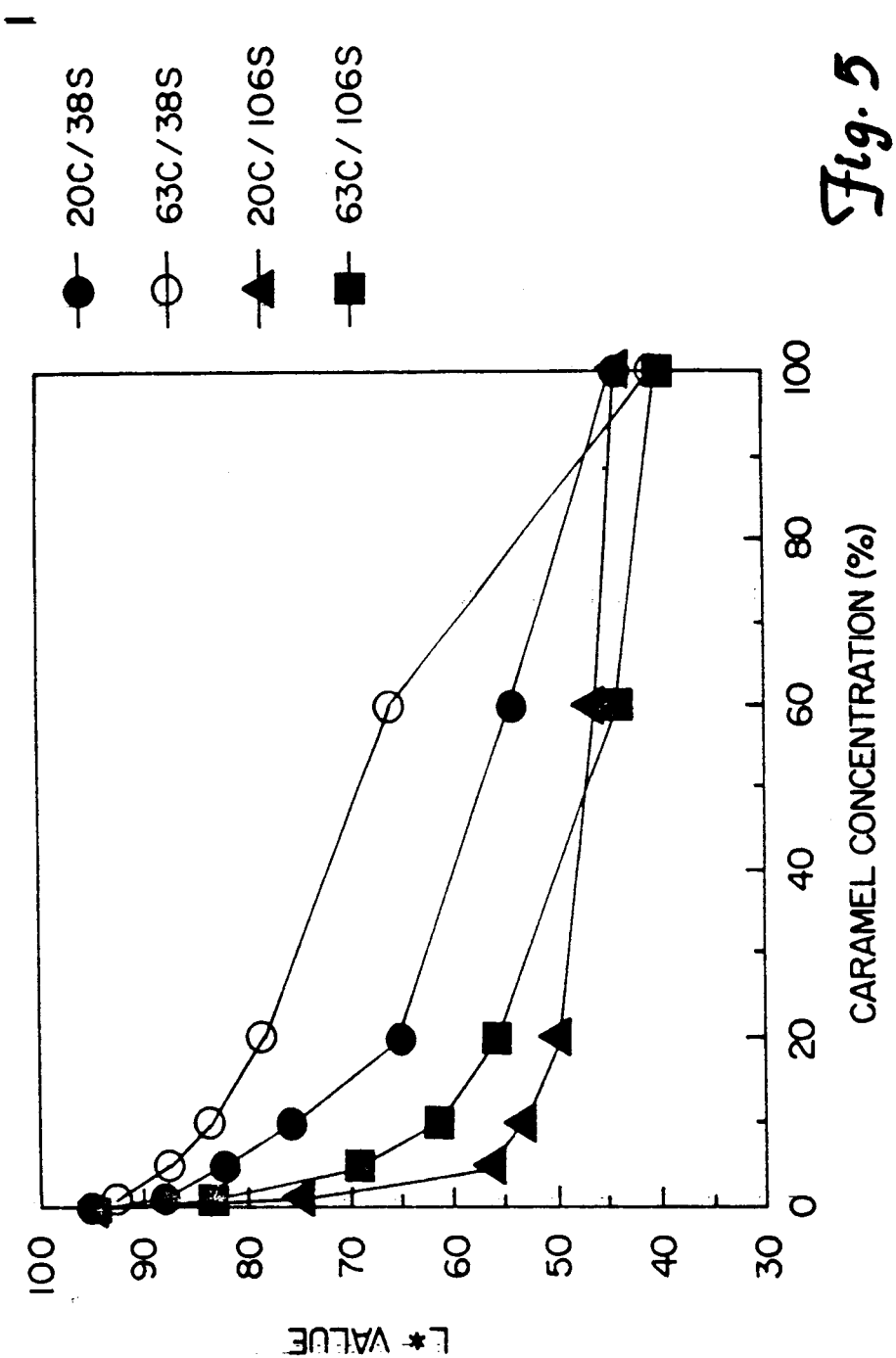
FIG. 5 is a graph illustrating the functional relationships between $L^*$ and caramel concentration to demonstrate the effect of caramel dilution and particle size dependence. The graph also illustrates the reversal of the particle size effect on $L^*$ upon caramel dilution. Caramel particles were 20 microns (20C) and 63 microns (63C) in diameter and were diluted with 38 micron (38S) and 106 micron (106S) sugar.
Figure 6:
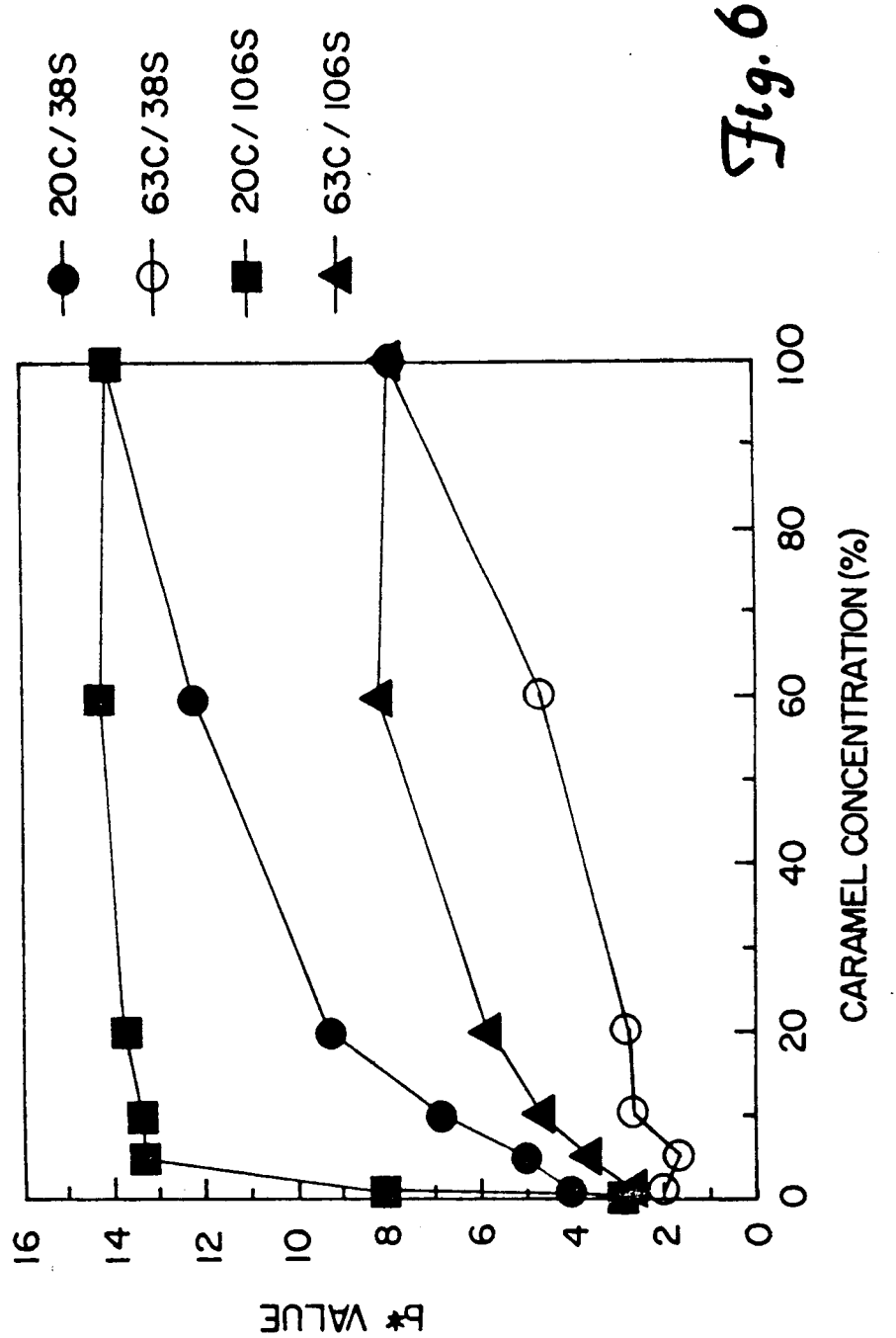
FIG. 6 is a graph illustrating functional relationships between $b^*$ and caramel concentration to demonstrate the effect of caramel dilution and particle size effects. Caramel particles were 20 microns (20C) and 63 microns (63C) in diameter and were diluted with 38 micron (38S) and 106 micron (106S) sugar.
Figure 7:
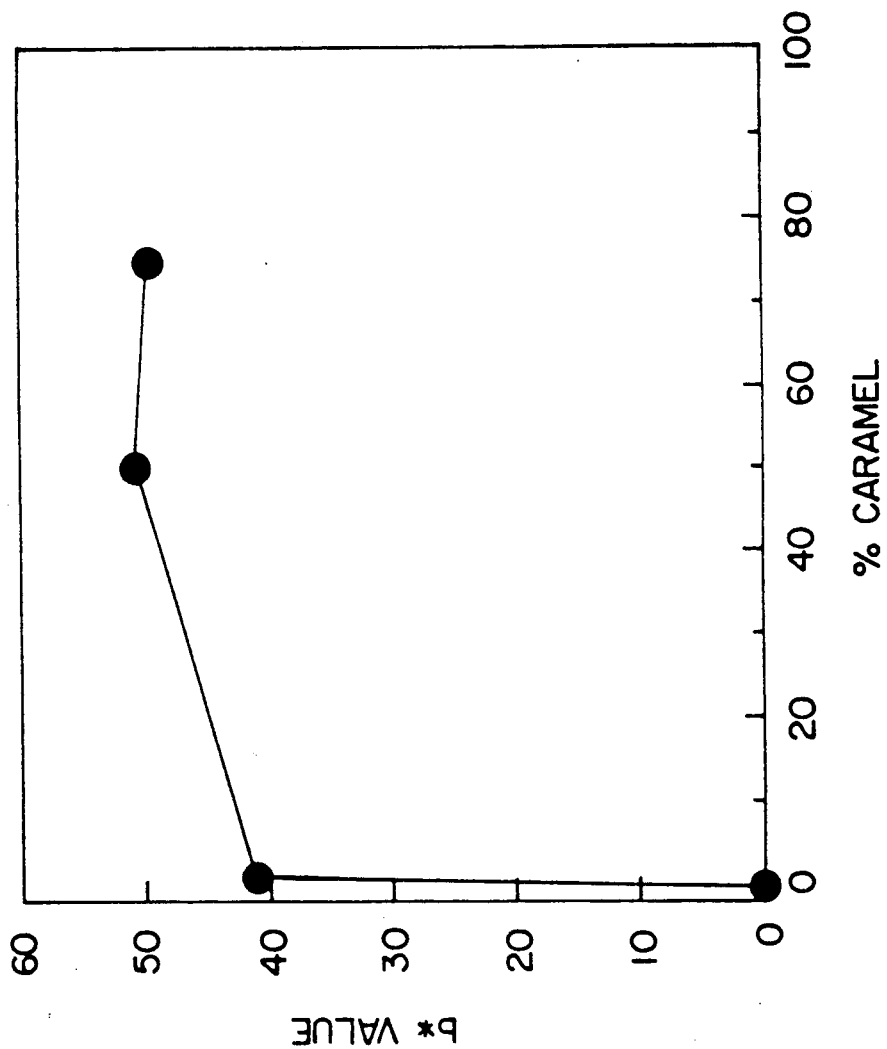
FIG. 7 is a graph illustrating functional relationships between $b^*$ and caramel concentration with 20 micron caramel and sugar coparticulates.

Results of experiments as illustrated in FIGS. 5 and 6 were unexpected. In these experiments RT 175 caramel from Sethness Company of different particle sizes was diluted with powdered sugar (sucrose) of different particle sizes. The particle size effect, i.e. the smaller the colorant particle the lighter the color (i.e. increased L* value), of the colorant reverses upon dilution with the finely powdered diluent. That is, large particles of caramel colorant appear lighter than small particles when diluted with powdered sugar when the particle size of the colorant is in excess of 5 microns. Similarly the preparation of 20 micron coparticles of sugar and caramel darkens the resulting coparticulate powder by increasing the b* value as seen in FIG. 7. However, the particle size effect for the sugar, i.e. an originally "colorless" material, is still true for the diluent. That is, the smaller the size of the particles of powdered sugar, the greater its ability to mask the color of the colorant. Microencapsulation of a coparticulate or a mixture of caramel (colorant) and powdered sugar (diluent) in a carrier or encapsulant may darken the mixture by increasing the effective particle size of the powdered sugar, and also by reducing the difference in the refractive index between the colorant and its surrounding material, i.e. air versus shortening, which again can increase the brown (b*) color of the encapsulant. This is true for colorant particles in the size range of between 1 micron and 100 microns. An encapsulant like fat can also help in masking color by selecting appropriate processing conditions.

The above discussed relationships allow flexibility in providing both a proper initial and a proper final color for the coloring system.

As discussed above, decreasing the particle size substantially shifts perceived color intensity (L* value) from dark to light. With regard to the use of caramel as the colorant, an incremental whitening effect was observed by decreasing the particle size of microcapsules that contained caramel and sugar in lipid. The whitening (increase of L* value) effect was particularly pronounced when the colorant was sprinkled evenly onto a surface of a biscuit. The coated surface appeared white to light yellow (approximately the same color as wheat flour dough). Upon heating in a microwave oven, however, the extent of color development occurs independent of diluent and colorant particle sizes since each particle becomes hydrated or solubilized and the same number of colorant molecules go into solution to form a uniformly brown surface. Therefore, decreasing the particle size of the colorant greatly increases the difference in lightness before and after baking.

The shift in color lightness as a function of particle size results from the decrease in total diffuse reflectance with an increase in particle size. With small particles the path length for the light beam across the colorant particle is short and the interaction between the illumination and the pigment is reduced. As the particles become larger they provide longer effective path lengths and greater opportunity for the radiation to be absorbed. Each of the particle's optical interfaces provide opportunity for diffusion and a resulting decrease in the color intensity. Upon solubilization of the caramel particles the light reflectance goes to zero and the perceived color is governed predominantly by the concentration and absorption spectrum of the pigment. The physics of this particle size effect is discussed below.

Food product color can affect the coloring system. The coloring system can be applied in several forms. The system can be utilized without the use of a carrier or an easily dispersible carrier for short shelf-life when it is appropriate to sprinkle the colorant and diluent directly onto the product or applying it in another preselected region immediately prior to microwave irradiation. This could be used, for example, when the color system is sold dry in a shaker container to be utilized immediately before microwave irradiation by a consumer.

The colorant and diluent can be utilized in a carrier which keeps the system substantially immobilized during long shelf life of a product. The carrier should have the property of not diffusing into the product and also of preventing solubilization of the diluent and/or colorant before being heated in the microwave. When the colorant and/or diluent are water soluble then the carrier should be preferably hydrophobic. Examples of hydrophobic carriers are fats, waxes, etc. If the colorants and diluents are oil soluble or hydrophobic then the carrier can be a hydrophilic substance such as starch or a gum.

The diluent and colorant can be coparticulized. Coparticulizing can be done by spray-drying a solution of diluent and colorant. The resulting coparticles of diluent and colorant should have a weight majority with a size in the range of between about 1 micron and about 50 microns, preferably in the range of between about 1 micron and about 20 microns, and most preferably in the range of between about 1 micron and about 5 microns.

The use of coparticulates may be desirable when the diluent and colorant are to be used in a carrier-containing color system.

For the purposes of this invention the coloring system should be stable during storage, whether that storage is in the form of drys for sprinkling onto a product prior to microwave irradiation or when used on or in a product. This means that the coloring system, either in dry form or when applied to a food product, does not visibly change colors when stored at 5° C. for 10 days. This also applies to the use of the terms "immobilized" and "isolated".

One of the advantages of the present invention is that it can be applied at any preselected region of the product, e.g. on the outside as a surface coating or inside the product. Application techniques for the system can be sprinkling, spraying, painting, dipping, mixing, blending, etc.

The concentration or amount of colorant used will be determined by the desired color as well as the product size and the location of the region with which the coloring system is to be associated. This can be easily determined empirically by a user of the system.

Further, the invention also provides the advantage of being able to generate a uniform color or in the alternative speckled coloring can be provided to give, e.g., a "sprinkled on cinnamon" appearance. Speckling can be accomplished by using a system non dispersible or insoluble colorant like cinnamon and/or by making a weight majortiy of the colorant particles size in the range of between about 45 microns and about 150 microns preferably in the range of between about 50 microns and about 100 microns and more preferably in the range of between about 50 microns and about 75 microns.

Another advantage is that the color system can, by appropriate selection of ingredients, be used to indicate when the food substrate is done. This is done by controlling the kinetics of or time to color release or a preselected color intensity achievement.

The present invention is usable with various types of food products as substrates and can be applied in any preselect region of the food as discussed herein. preferred food products are starch based for example those made from cereal grain. Such cereal grains include wheat, corn, barley, triticale and mixtures thereof. Generally, for example, the term corn-based or wheat-based means that a majority of the cereal grain component or the like is in a weight majority of the cereal grain or starch containing components. Such products can, in use, be a batter, dough, for example, biscuit dough and cookie batters. Generally cookie batters are referred to as "dough" but are more accurately a pasty batter, since dough more accurately refers to products containing developed gluten. Example of such products include biscuit dough and muffin, cake and pancake batters. The food substrate can be substantially uncooked, partially cooked or cooked and can be heated in either a microwave oven or a conventional oven. Further, it is to be understood that the current invention can be utilized as a component in a dry mix for later reconstitution by a consumer.

Although not being bound by the following theory as to the operability of the present invention, it is provided.

Microencapsulation of a caramel colorant with fat is useful for effecting rapid browning of food products during microwave heating. The reduction of the caramel particle size together with the dilution of the caramel with a white carrier can substantially completely mask the brown color. Upon hydration, however, color development occurs quickly due to the following two concurrent events: (1) The particle size effect disappears, since each colorant particle dissolves to form a brown solution which results in a several fold increase in perceived color intensity; and (2) the white carrier dissolves to form a clear colorless solution, which removes the masking effect. Microencapsulation with a fat is used to prevent hydration until heat is applied during MW cooking.

As light passes through a material it may be selectively absorbed and exit with a modified wavelength spectrum, which is perceived as color. For example, an aqueous solution of caramel color absorbs most of the shorter wavelengths (350 to 600 nm) and therefore transmits light that is deficient in radiation of these wavelengths, i.e. the solution appears brown. If the chromophoric molecules are concentrated into particles, then the absorption spectrum of the suspension of particles may be flattened relative to the solution of individual chromophores. This phenomenon arises because the light in the more intense part of the spectrum may be totally absorbed within a single particle, so the other chromophores in suspension do not contribute to absorption at that wavelength. Since all wavelengths would be absorbed to an equal extent in a completely flattened spectrum, the material would appear colorless. It would appear black if all wavelengths were totally absorbed in very large particles, or white if the particles were small, giving rise to strong diffuse reflectance.

It thus becomes evident that complete hydration and dissolution of particles greatly increases the color intensity by elevating the effective molar concentration of chromophores, alleviating the spectral flattening.

Color may also be imparted by the selective scattering of radiation. For example, the blue color of the sky is a result of increased scatter of sunlight by atmospheric particles at shorter wavelengths.

Light scattering is a result of reflection and refraction of radiation at optical interfaces. This redistribution of radiation becomes substantial in diffusely reflecting material, where diffuse describes the reflectance of a matte surface as opposed to that of an ideal mirror-type surface which reflects light only at a single angle dictated by geometric optics. Diffuse reflectance can be considered to be the result of mirror-type reflections from an assembly of microcrystalline faces statistically distributed over all possible angles.

The contribution of light scattering to the perception of visual color is particularly important for powdered solids, since most of them scatter so strongly that no light is transmitted. The degree of light scattering is governed primarily by (1) the particle size of the solid, and (2) the difference in refractive indices of the solid and surroundings.

Scattering is inversely proportional to the diameter of the particles in the powdered solid. This means that a reduction in the particle size of a powdered sample greatly depresses the intensity of its color perception, i.e. a solid of any color turns white as the particle size approaches zero, so long as the particles are large enough to retain defined boundaries at which diffuse reflection can occur. This is generally the case if the particle size is several times as large as the wavelength of light. For visible light, this implies a particle size of one micron or greater.

The way in which particle size modifies perceived color intensity by affecting diffuse reflectance may be understood as follows. The effective path length of radiation impinging on a solid increases with the particle size. With small particles, the path length for the light beam across the colorant particle is short and the interaction between the illumination and the pigment is reduced. Each of the particles' optical interfaces provides opportunity for diffuse reflectance and a resulting decrease in absorption of radiation. The spectrum of scattered light is virtually identical to that of the incident light, i.e. colorless for sunlight, and scattering lowers the availability of light for absorption in various spectral regions and subsequent coloration.

The color is also masked by strong scattering and diffuse reflectance from the finely powdered diluent. Small colorless diluent particles do not absorb in the visible region of the spectrum and therefore make no spectral contribution of their own, but their high reflectivity contributes to the whitish appearance of the product surface and diminishes the amount of light reaching the chromophoric colorant particles. The amount of diffuse reflectance from the mixture is inversely proportional to the particle diameter of the diluent.

The reversed particle size effect of diluted caramel may be understood as follows. The total amount of diffuse reflectance is determined primarily by the diluent when used at a dilution greater than 10-fold by weight to colorant. While a slight decrease in the particle size of the colorant does not make a noticeable contribution to the large amount of reflectance from the diluent, it does substantially raise the number of absorption centers and thereby elevate the statistical likelihood for interaction between the incident light and the chromophore. This results in a net increase in the visual color intensity. Alternatively, this reversed particle size effect may be visualized as a coating of the sugar particles by the colorant which again exposes the chromophores.

Therefore, for optimum masking to occur, a coarse colorant should be diluted with a very fine diluent. However, the ratio of particle size diameter of colorant to diluent should not exceed about 5 due to particle separation at greater ratios.

Figure 4:
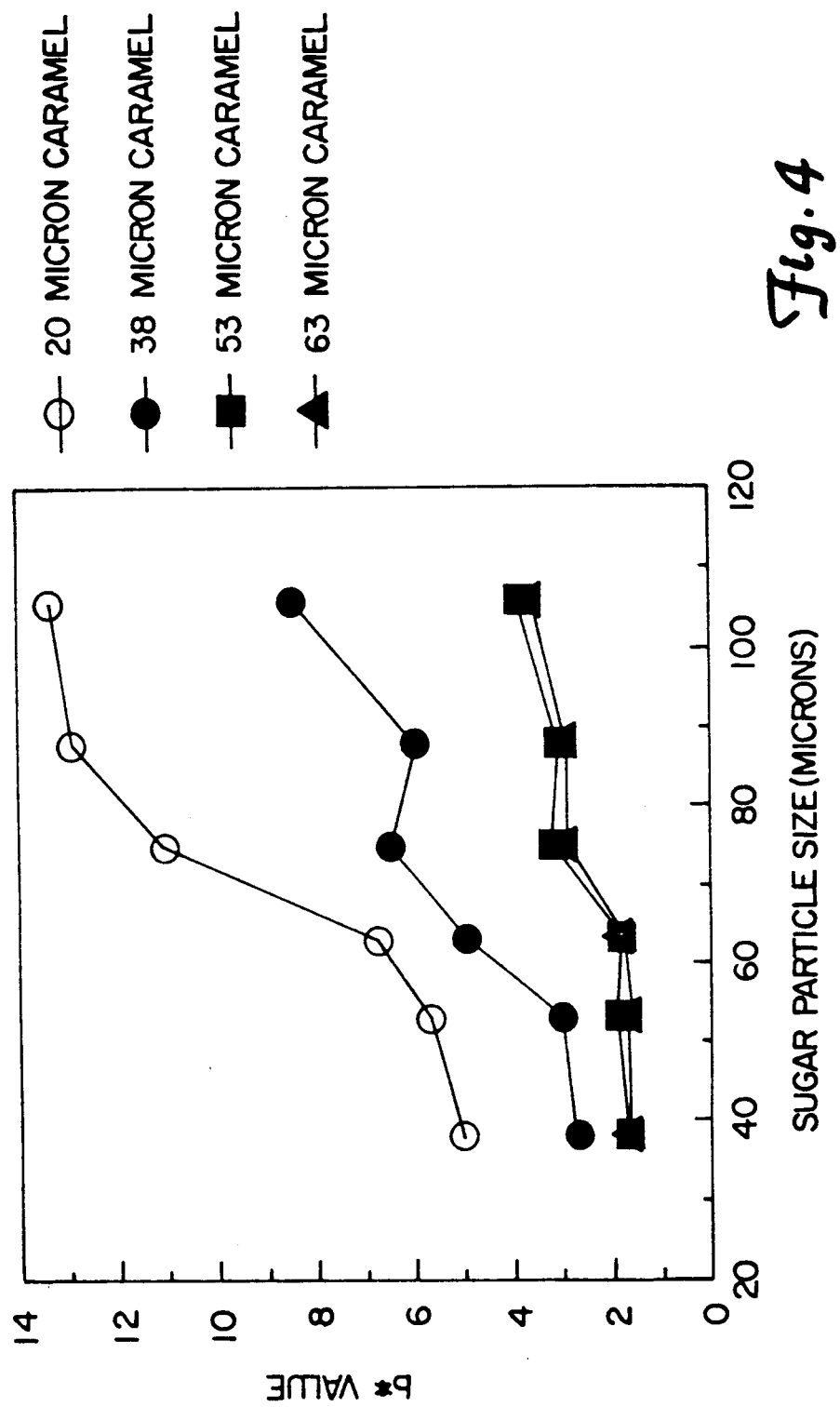
FIG. 4 is a graph illustrating functional relationships between $b^*$ and sugar particle size for various caramel particle sizes. The sugar: caramel ratio was 95:5.

As seen in FIGS. 1 and 4 dilution and particle size of colorant not only affect the lightness (L*) of the sample, but also the color (b*). Dilution decreases the b* value which lower the intensity of brown color perception. Decreasing the particle size of colorant, however, increases the b* value. Therefore, decreasing the particle size of diluted colorant increases the brown color intensity both by reducing the L* value and by elevating the b* value. The effect on the b* value is particularly pronounced in the case of coparticulates. This presumably arises from the coating of sugar by caramel, just as in the case of 20 micron colorant particles (but with greater efficiency at the molecular level).

From FIGS. 1-7, it becomes apparent that the color of most substrates can be matched with a combination of coparticulates and diluted caramel.

As seen in FIG. 8, microencapsulation of 63 micron caramel colorant at a payload of 20% provides only minor additional masking. The dilution effect is canceled by the decrease in total diffuse reflectance due to the similar refractive indices of the colorant and its coating (fat) compared to the large difference in refractive indices of the colorant and its surroundings before microencapsulation (air) as shown in Table I. Microencapsulation of 20 micron particles greatly darkens the sample due to a particle size effect in addition to the refractive index effect: microencapsulation of 20 micron particles to form 100 micron capsules increases the effective particle size substantially, which increases the color intensity. Dilution of 63 micron colorant with 38 micron sugar enhances the microencapsulation effect since microencapsulation also increases the effective size of the carrier, thereby decreasing light reflection by the carrier. These results are summarized in Table II. Additional processing variables of microencapsulation may both lighten or darken the initial color of the colorant/diluent mix.

TABLE I
REFRACTIVE INDEX OF SELECTIVE MEDIA

| Medium | Refractive Index at 20° C. |
|---|---|
| Air | 1.00 |
| Water | 1.33 |
| Fats and oils | 1.44–1.47 |
| Sugars | 1.48–1.52 |
| Inorganic salts | 1.50–1.66 |

TABLE II
MICROENCAPSULATION EFFECT ON COLOR INTENSITY

| | Color Intensity (L*Value) | |
|---|---|---|
| | Not Encapsulated | Encapsulated |
| 20 micron caramel | 61.17 | 32.52 |
| 63 micron caramel | 28.38 | 38.90 |
| 63 micron caramel/sugar (4:96) | 85.64 | 79.94 |

The following examples illustrate the operability and the variety of uses to which the coloring system can be utilized.

EXAMPLE 1

The formulas listed in the following table were used to prepare cookie dough batter. Included in the microwave/caramel formula was an encapsulated caramel which comprises 0.8% caramel (Sethness RT 175) with a particle size of 40 microns along with 19.2% powdered sugar and 80% fat (stearic acid: Neustrene, 4:1).

| Ingredient | Oven Control | MW Blank | MW/Caramel |
|---|---|---|---|
| Brown sugar | 17.10% | — | — |
| Sugar | 11.41% | 20.49% | 14.72% |
| Margarine | 12.17% | — | — |
| Shortening | 10.00% | 12.93% | — |
| Vanilla | 0.82% | 0.63% | 0.63% |
| Eggs | 5.98% | — | — |
| Flour | 16.26% | 28.96% | 28.96% |
| Soda | 0.75% | 0.38% | 0.38% |
| Salt | 0.36% | 0.59% | 0.59% |
| Chocolate chips | 25.15% | 25.15% | 25.15% |
| Water (added) | — | 9.37% | 12.52% |
| SALP | — | 0.38% | 0.51% |
| Albumen | — | 0.37% | 0.37% |
| Fibrim 1000 | — | 0.75% | 0.75% |
| Encaps. Caramel | — | — | 18.7% |

Figure 10:
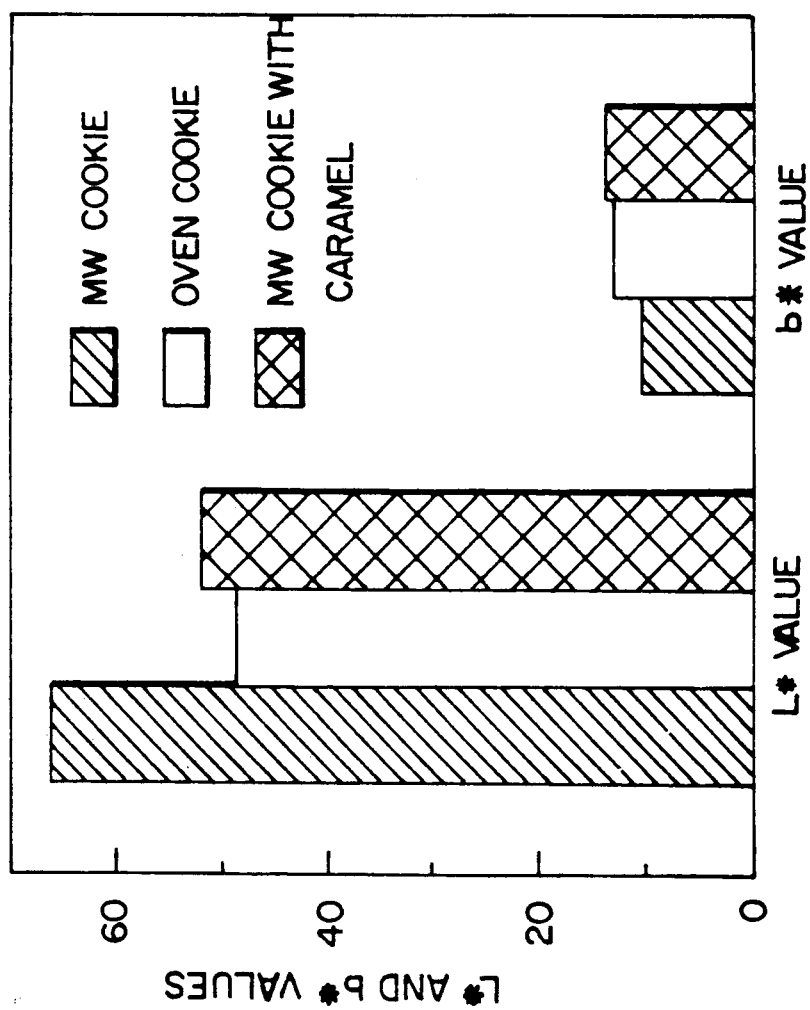
FIG. 10 is a bar graph illustrating $L^*$ and $b^*$ values for cookies containing microencapsulated caramel and sugar inside the cookie dough.
Figure 11:
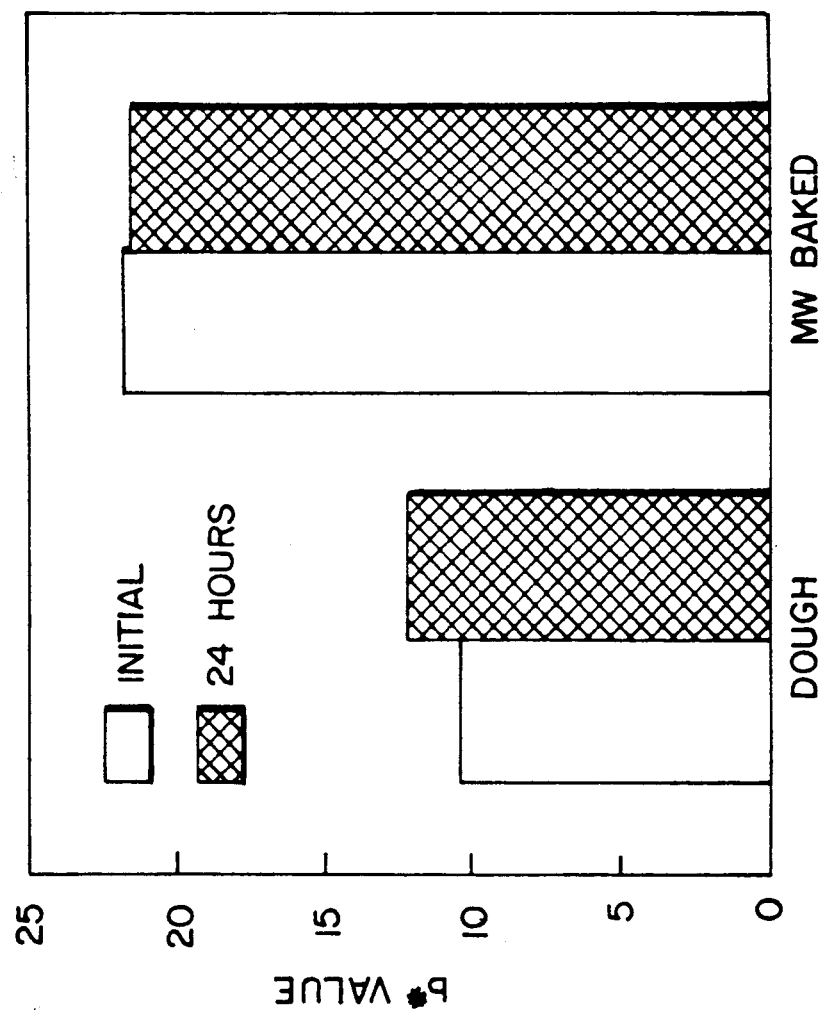
FIG. 11 is a bar graph illustrating shelf life stability of biscuits containing microencapsulated caramel and sugar at 4° C.
Figure 12:
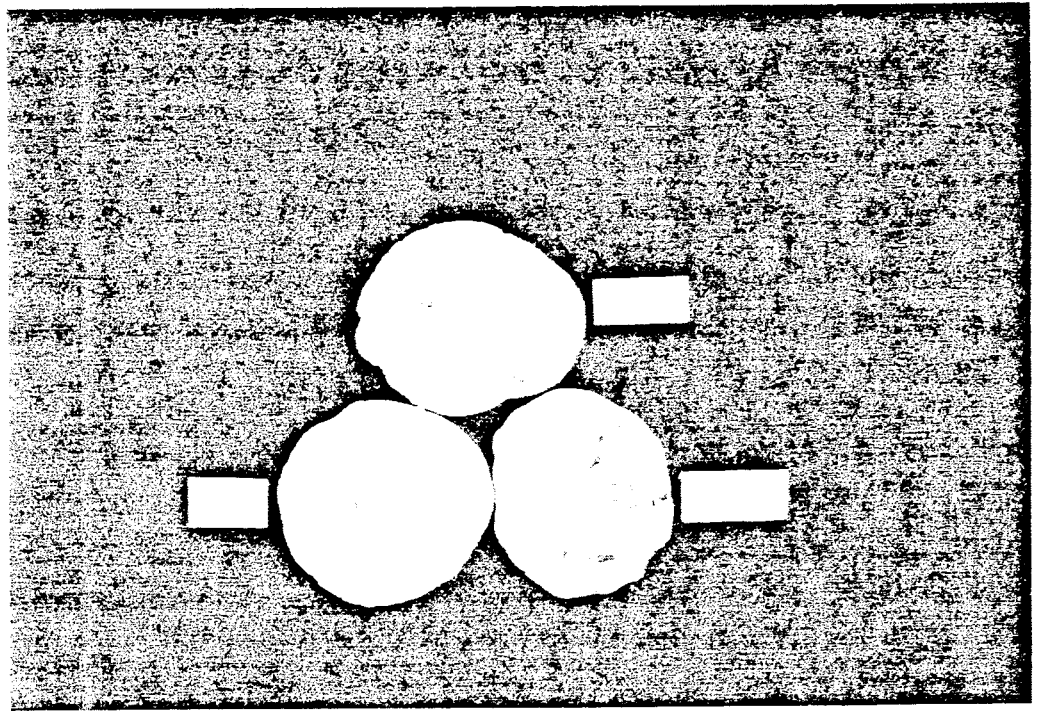
FIG. 12 is a color photograph of cookies prepared from Pillsbury refrigerated cookie dough with product A being microwave prepared cookie dough, product B being conventionally cooked cookie dough and product C being microwave cooked cookie dough incorporating a color system of the present invention as set forth in Example 1.

Encapsulated caramel was mixed into the dough for the microwave/caramel variable and all three formulas were baked into cookies. It can be seen from FIGS. 10 and 12 that the microwave with caramel product was colored similar to the conventionally cooked product while the microwave without the coloring system remained relatively white. Cooking time for conventional was 8–10 minutes at 190° C. and in the microwave cooking both products were cooked for 45 seconds on high in a 700 watt Litton Generation II microwave oven.

The above formulae are different. The microwave formulae were made to provide microwave cooking tolerance, particularly to spreading. Also, the color system contained sugar making the total sugar content of the two microwave formulae about equal. Likewise, the color system contained fat making the fat content of the three formulae about equal. The oven control contained brown sugar which would provide some precoloration. Even though there are some differences, the effectiveness of the invention is illustrated.

EXAMPLE 2

The coloring system as set forth in Example 1 was used by sprinkling the system on top of pillsbury buttermilk biscuit dough pads having a top surface area of 19.5 cm$^2$. The coloring system was sprinkled before exposure to microwave radiation and had a weight of 550 milligrams for each biscuit.

Figure 9:
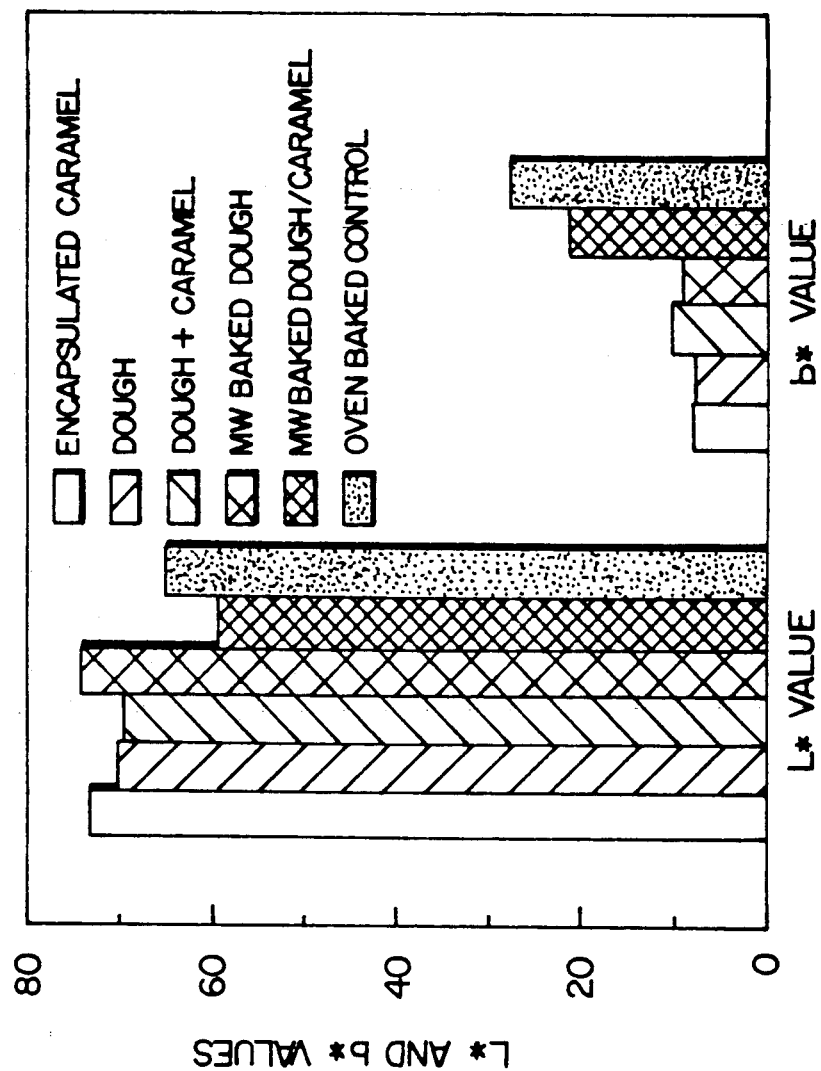
FIG. 9 is a bar graph illustrating $L^*$ and $b^*$ values for biscuits containing microencapsulated caramel and sugar sprinkled on the top surface.

After microwave exposure the biscuits had a nice brown color similar to conventionally cooked biscuits. Biscuits cooked in a microwave oven without such assistance remained basically the color of the original dough, which is relatively white, as shown in FIG. 9.

The foregoing sets forth preferred embodiments of the present invention. However, the invention is not to be limited to the specific scope of the disclosure and examples presented herein except to the extent that such limitations are found in the claims.

What is claimed is

1. A color system for use with foods that are to be heated, said color system including:
   a colorant in particle form wherein at least a weight majority of the particles have size in the range between about 10 microns and about 150 microns and having a preselected CIE L* value; and
   a diluent mixed with said colorant with said diluent being in the particle form having a selected particle size and being present in a quantity sufficient to provide a DE value of at least about 10, said diluent further having the property of being dissipatible when used in conjunction with a food product during exposure of said food product to microwave radiation.

2. A color system as set forth in claim 1 wherein said diluent has at least a substantial portion thereof with a particle size in the range of between about 1 microns and about 50 microns.

3. A color system as set forth in claim 1 or 2 wherein said diluent is hydrophilic.

4. A color system as set forth in claim 2 wherein said diluent is lipophilic.

5. A color system as set forth in claim 1 wherein said colorant is soluble in a component of a food product.

6. A food color system a set forth in claim 2 wherein said colorant is soluble in a component of a food product.

7. A color system as set forth in claim 6 wherein said colorant is soluble in fat.

8. A food color system as set forth in claim 6 wherein said colorant is soluble in water.

9. A food color system as set forth in claim 8 wherein said diluent is soluble in water.

10. A color system as set forth in claim 1, 2, 5 or 6 including:
a carrier associated with said diluent and colorant providing shelf stability therefor with said carrier being dissipatible upon exposure to microwave radiation.

11. A food color system as set forth in claim 10 wherein
said carrier is soluble by a component of a food product substrate when said food color system is applied to a food product substrate.

12. A food color system as set forth in claim 11 wherein
said diluent and colorant are dispersed within particles of carrier with at lest about a majority of said carrier particles having a size within the range of between about 20 microns and about 300 microns.

13. A food color system as set forth in claim 1 wherein
said carrier is water soluble.

14. A food color system as set forth in claim 11 wherein
said carrier is soluble in fat.

15. A food color system as set forth in claim 11 wherein
said diluent has at least about a majority by weight of the particles in the range of between about 1 micron and about 20 microns and said colorant has at least a majority of the particles by weight in the range of between about 10 microns and about 60 microns.

16. A food color system as set forth in claim 10 including
a food product substrate with said food color system applied thereto.

17. A food color system as set forth in claim 16 wherein
said substrate is starch based.

18. A food color system as set forth in claim 17 wherein
said substrate is cereal grain based.

19. A food color system as set forth in claim 18 wherein
said substrate is wheat based.

20. A food color system as set forth in claim 18 wherein
said substrate is corn based.

21. A food color system as set forth in claim 18 wherein
said substrate is a dough.

22. A food color system as set forth in claim 18 wherein
said substrate is batter based.

23. A food color system as set forth in claim 21 wherein
said substrate is a refrigerated dough.

24. A food color system as set forth in claim 21 wherein
said substrate is a biscuit dough.

25. A food color system as set forth in claim 22 wherein
said substrate is a cookie batter.

26. A food color system as set forth in claim 22 wherein
said batter is selected from the group consisting of: a muffin batter, cake batter and a pancake batter.

27. A food color system as set forth in claim 16 wherein
said substrate is substantially uncooked.

28. A food color system as set forth in claim 16 wherein
said substrate is partially cooked.

29. A food color system as set forth in claim 16 wherein
said substrate is cooked.

30. A food color system as set forth in claim 16 wherein
said diluent, colorant and carrier are applied to an exterior region of said substrate.

31. A food color system as set forth in claim 16 wherein
said diluent, colorant and carrier are applied to an interior region of said substrate.

* * * * *

UNITED STATES PATENT AND TRADEMARK OFFICE
CERTIFICATE OF CORRECTION

PATENT NO. : 5,002,789

DATED : March 26, 1991

INVENTOR(S) : Ernst Graf et al.

It is certified that error appears in the above-identified patent and that said Letters Patent is hereby corrected as shown below:

Col. 14, line 61, delete "a", insert --as--.

Col. 15, line 16, delete "lest", insert --least--.

Signed and Sealed this

Twentieth Day of October, 1992

Attest:

DOUGLAS B. COMER

Attesting Officer

Acting Commissioner of Patents and Trademarks